3,376,205
METHOD OF REVIVING SILICATE SEALING SOLUTIONS

Charles C. Cohn, Atlantic City, N.J., assignor to Samuel L. Cohn and Charles C. Cohn, copartners trading and doing business as Colonial Alloys Company, Philadelphia, Pa.,
No Drawing. Filed July 15, 1964, Ser. No. 382,946
2 Claims. (Cl. 204—35)

ABSTRACT OF THE DISCLOSURE

An alkali silicate sealing bath in which turbidity has appeared after some use is rendered clear by first adding a sufficient quantity of an alkali to raise the pH of the bath to a value in excess of the normal operating pH in order to remove the turbidity. The bath is then either heated or allowed to stand for a period, and its pH is subsequently adjusted by the addition of acid or alkali to the normal operating value.

---

This invention relates to a method of maintaining operability of aqueous solutions of alkali metal silicates used for sealing porous aluminum oxide coatings on aluminum or aluminum-base alloys.

The aqueous silicate solutions referred to are of the type described in U.S. Patent 1,946,153, issued Feb. 6, 1934, U.S. Patent 2,161,636, issued June 6, 1939, and in my copending applications Ser. Nos. 836,056, filed Aug. 26, 1959 and now abandoned, 92,156, filed Feb. 28, 1961 and now abandoned, and 143,034, filed Oct. 5, 1961 now Patent 3,174,916.

For convenience, only solutions of sodium silicate will be referred to while it is to be understood that the method to be described is applicable to solutions of other soluble silicates which may be used as equivalents of sodium silicate solutions, for example, potassium silicate.

The above patents and applications relate generally to the use of solutions of sodium silicate to treat porous coatings composed of aluminum oxide on the surface of aluminum or aluminum alloys. Such porous coatings may be produced by various methods, the most prevalent method being "anodizing." It has been established by the above patents and applications that the treatment of anodized coatings on aluminum by solutions of sodium silicate under the proper conditions of temperature, pH and time of application imparts to the coatings greatly increased resistance to corrosion.

Typically, for sealing aluminum oxide coatings, a dual-sealing procedure of the type described in my aforementioned copending applications is used. Each of the dual-sealing procedures involves the performance of a first sealing step, which, in the respective applications, involves treatment of an oxide coating by an aqueous solution of a weak metallic base, hot water, and an alkali silicate solution. The second sealing step in each of these sealing procedures involves treatment of the partially sealed coating by a second sealing solution containing an alkali metal silicate. Sodium silicate solutions for use as second sealing solutions are typically prepared by dissolving sodium silicate having a ratio of $Na_2O$ to $SiO_2$ of 1:3.2 in water to a concentration of approximately 5%. If necessary, either sodium hydroxide or acetic acid or other suitable bases or acids may be added in small quantities in order to adjust the pH (at room temperature) to the optimum operating value which has been found for dual seals to be approximately 11.0.

In the case of single sealing, wherein the silicate solution is used to seal oxide coatings on aluminum without the benefit of preliminary partial sealing, the pH should be somewhat lower than 11.0 so that the oxide coating is not attacked.

For use, the temperature is raised to a suitable operating temperature, for example, 205° F. Anodized aluminum or partially sealed aluminum is then immersed in the solution for a length of time which is typically about five minutes.

In order to maintain the operability of a bath such as that just described, a maintenance procedure must be used. Water must be added to replace that lost by evaporation and by dragout, that is, water adhering to the work which has been sealed. Likewise, sodium silicate imparted to the aluminum oxide coating or lost by dragout must be replaced. Even more critical is the necessity for maintaining the pH of the silicate solution within close tolerances of its nominal optimum value in order to insure proper operation and uniform resistance to corrosion among the various pieces of work sealed at different times in the same solution.

One of the difficulties encountered with sodium silicate sealing solutions is that they have a tendency to change composition after they have been used in sealing. This change in composition is characterized by the appearance of an insoluble precipitate which intereferes with the sealing process. The rate of appearance of this precipitate is increased by the application of heat, which is essential to the sealing process. Ordinarily, the particles of the precipitate are so fine that they remain in suspension even when the sealing solution is cold. In addition, the appearance of the precipitate is accompanied by the formation of a scum on the surface of the solution which, with the suspended precipitate leaves unsightly deposits on the surface of the aluminum immersed in the sealing solution, and these deposits are not easily removed by rinsing with water. Therefore, shortly following the appearance of turbidity in a silicate sealing solution, it has been necessary to discard the entire solution and to replace it with a fresh solution.

Accordingly, it is an object of the present invention to provide a simple, inexpensive method whereby a silicate sealing solution can be maintained free of turbidity and of good sealing quality for an indefinite length of time.

The practice of this invention amounts to the application of a maintenance procedure periodically during normal operation of a silicate sealing bath. The invention is characterized by the performance of several successive, simple steps, which should be performed following the appearance of cloudiness in the sealing bath.

If pH is maintained at a nominal operating level, e.g. about pH 11.0, by means of a periodic sampling and adjustment procedure, the pH should always be within a few tenths of pH of the nominal value.

Upon the appearance of cloudiness the first step involves the addition of a base, preferably sodium hydroxide, to raise the pH to a value considerably in excess of the nominal value. For example, if the nominal value of pH is 11.0, sufficient sodium hydroxide should be added to raise the pH of the solution approximately to 12.0 or more (pH is to be measured at 25° C.). The liquid is then heated (if not already heated) to a temperature approaching the boiling temperature of water, for example, 205° F. or higher. This temperature corresponds to the normal operating temperature of the solution and no additional heating is necessary if this step is carried out in the treating bath. The solution is maintained at this high temperature until the reaction between the added sodium hydroxide and the precipitate is completed. The completion of this reaction is characterized by clearing of turbidity in the solution. A sample of the solution is then allowed to cool to a temperature at which the pH can be measured accurately and conveniently.

If extended periods of time in which the bath is not in use are available, heating of the bath to effect reaction between the precipitate and the added alkali is not absolutely necessary. If sodium hydroxide is added in sufficient quantity to raise the pH of the bath approximately to 12.0, and the bath is allowed to stand over a weekend, for example, it will be found to be clear and operable when operation is to be resumed.

It will be noted that, following the reaction between the precipitate and the sodium hydroxide, the pH goes from 12.0 approximately to 11.0 which is the nominal operating pH. Usually, very little adjustment, if any, is necessary.

However, if the resultant pH is lower than the desired operating pH, a small amount of sodium hydroxide can be added to raise the pH. Likewise, if the resulting pH is too high, a weak acid, for example acetic acid or boric acid, can be added. Dilute solutions of strong acids, for example sulfuric acid can be used to adjust the pH downward. However, the use of concentrated acids is not advisable in that local gel formation is likely to occur at the point on the surface of the bath at which the concentrated acid is added.

Following this procedure, the solution is again operable as a sealing bath, and may be used following the normal maintenance procedures including pH adjustment and silicate addition, until turbidity reappears. At this point, the revivification procedure should be performed again, and it may be repeated indefinitely. The only conditions necessitating bath replacement involve the accumulation of contaminants such as oil or dirt in the bath.

A particular procedure in accordance with the invention will now be described:

A cloudy and inoperable 5% (by weight) solution of sodium silicate which originally had a $Na_2O$ to $SiO_2$ ratio of 1:3.2 and which has a pH of 11.0 may be revived and rendered clear and operable by the following procedure.

Sufficient sodium hydroxide is added and dissolved, or added in aqueous solution, to raise the pH to 12.0 at 25° C.

The solution, is maintained at 205° F. until the reaction between the sodium hydroxide and the precipitate is completed so that the precipitate is dissolved.

A sample of the solution is allowed to cool to 25° C., a temperature at which the pH can be measured accurately and conveniently.

The pH is then measured electrometrically.

If the pH measured is lower than 11.0, sufficient sodium hydroxide is added to raise the pH to 11.0.

If the pH measured is greater than 11.0, acetic acid is added in sufficient quantity to lower the pH to 11.0.

Boric acid, tartaric acid, and various other acids may be used in accordance with this example in place of acetic acid.

In general, for most silicate sealing baths, a quantity of base sufficient to remove turbidity raises the pH of the bath at least to 12.0 although, in some cases, the turbidity can be removed by adding only enough of the base to raise the pH approximately to 11.7.

Because of the wide variations of concentration and pH in different silicate sealing baths, the minimum pH necessary to revive the bath can be most conveniently determined by test, disappearance of cloudiness on heating being observed. Once this pH value is determined for a given bath, it is only necessary to add a sufficient quantity of the base to raise the pH to this value each time the revivification procedure is applied.

It will be evident that the advantages derived from use of the method of the present invention are twofold. By the provision of a method by which a sealing bath can be maintained in an operable condition over an extended period of time, a considerable saving of money can be realized because of the elimination of the necessity for periodic bath replacement. Furthermore, improved consistency in the quality of sealing is achieved.

What is claimed is:

1. The method of sealing with, and maintaining operability of, an aqueous alkali silicate solution comprising treating aluminum containing an oxide coating at an elevated temperature in an alkali silicate bath and, when turbidity appears, adding a sufficient quantity of an alkali to raise the pH of said bath to a value in excess of its normal operating pH and to cause disappearance of said turbidity when said solution is heated, heating said solution to effect disappearance of said turbidity, and then adjusting the pH of said solution to an operating value.

2. The method of sealing with, and maintaining operability of, an aqueous alkali silicate solution comprising treating aluminum containing an oxide coating at an elevated temperature in an alkali silicate bath and, when turbidity appears, adding a sufficient quantity of an alkali to raise the pH of said bath to a value in excess of its normal operating pH and to cause disappearance of said turbidity when said solution is left standing, permitting said solution to stand to effect disappearance of said turbidity, and then adjusting the pH of said solution to an operating value.

References Cited

UNITED STATES PATENTS

| | | | |
|---|---|---|---|
| 1,846,844 | 2/1932 | Clark | 148—6.27 |
| 1,946,149 | 2/1934 | Churchill | 204—38 |
| 1,946,153 | 2/1934 | Edwards | 148—6 |
| 2,161,636 | 6/1939 | Rankin et al. | 204—1 |
| 3,012,917 | 12/1961 | Riou et al. | 148—6.14 |
| 3,016,339 | 1/1962 | Riou et al. | 204—38 |
| 3,181,461 | 5/1965 | Fromson | 101—149.2 |

OTHER REFERENCES

| | | |
|---|---|---|
| 397,493 | 1933 | Great Britain. |
| 522,571 | 6/1940 | Great Britain. |

HOWARD S. WILLIAMS, *Primary Examiner.*

JOHN H. MACK, *Examiner.*

W. VAN SISE, *Assistant Examiner.*